United States Patent Office 2,831,869
Patented Apr. 22, 1958

2,831,869

STABILIZATION AND RECOVERY OF DICARBOXYLIC ACID ANHYDRIDES IN THE PRESENCE OF ALKALI METAL CATIONS

Gustave K. Kohn, Berkeley, Calif., assignor to California Spray-Chemical Corporation, Richmond, Calif., a corporation of Delaware No Drawing. Application June 27, 1955
Serial No. 518,387

3 Claims. (Cl. 260—346.8)

This invention relates to a method of stabilizing aliphatic dicarboxylic acid anhydrides against decomposition at elevated temperatures in the presence of alkali metal cations and particularly to an improved process for dehydrating aliphatic dicarboxylic acids, such as maleic acid, to their corresponding acid anhydride in the presence of alkali metal cations without appreciable decomposition of the dicarboxylic anhydride.

It has now been established that aliphatic dicarboxylic acid anhydrides, when subjected to elevated temperatures, and particularly reflux temperatures of the anhydride, and in the presence of alkali metal cations, will decompose with the evolution of carbon dioxide. This apparent decarboxylation reaction, catalyzed by the presence of alkali metal cations, is a rate reaction which, in the case of maleic anhydride, proceeds quite slowly at temperatures as low as about 150° C., but rapidly increases in rate with increasing temperatures and, at temperatures above 200° C., proceeds violently with almost instantaneous decomposition. Generally, the presence of water, even in small concentrations, increases the rate of decarboxylation over that obtained under anhydrous conditions.

The alkali metal cations may originate from a number of sources, such as previous low-temperature processing or from the water employed as the absorption medium in the recovery of acids and anhydrides prepared through vapor phase oxidation. Particularly in the case of maleic anhydride, citraconic anhydride, and other low molecular weight dicarboxylic acid anhydrides, which may be produced by vapor phase oxidation of organic compounds containing at least 4 carbon atoms, a water absorption system is employed to recover the vapor phase oxidation products which is then subject to further concentration and recovery through a dehydration step. In such instances, the inherent evaporation and cycling of the absorption stream rapidly concentrates the alkali metal cations introduced from the inlet water to a level sufficient to effect a material decomposition of the desired aliphatic dicarboxylic acid anhydride in a continuous dehydration and recovery system.

The foregoing difficulties, attendant the processing and recovery of aliphatic dicarboxylic acid anhydrides in the presence of alkali metal cations, have been difficult to overcome and, in most instances, have been met by processing at comparatively low temperatures with resulting loss in process efficiency and yield of product.

In accordance with the present invention, the decomposition or decarboxylation of aliphatic dicarboxylic acid anhydrides at elevated temperatures in the presence of alkali metal cations may be substantially inhibited by the incorporation of a minor proportion of boron oxide (boric anhydride) or a boric acid. It has been found that boron oxide will substantially inhibit the decarboxylating or decomposing effect of alkali metal cations on aliphatic dicarboxylic acid anhydrides at temperatures above 190° C. and permits continuous refluxing of the dicarboxylic acid anhydrides without a material rise in reflux temperatures for considerable lengths of time such as may be encountered in a continuous dehydration and recovery process. This inhibiting action of boric acid may be advantageously applied to the saturated and unsaturated aliphatic dicarboxylic acid anhydrides which preferably contain from 2 to 4 carbon atoms between the carbonyl groups, which carbon atoms may contain substituent groups such as alkyl or alkenyl radicals attached thereto. Exemplary of the dicarboxylic acid anhydrides which are susceptible of decomposition at elevated temperatures in the presence of alkali metal cations is maleic anhydride, the processing and recovery of which from aqueous solutions of crude maleic acid will illustrate the application of the subject invention.

Various methods of dehydrating aqueous solutions of maleic acid with a minimum of isomerization to fumaric acid have been proposed and the more effective processes involve distillation of gross and hydrate water, either per se or as an azeotrope, with a water-immiscible, inert liquid such as an aromatic solvent at temperatures of at least 190° C. In such a process, the maleic acid is dehydrated to maleic anhydride and the water of solution and hydrate water are removed overhead from a distillation column while retaining maleic anhydride in the still bottoms. Under these circumstances, the alkali metal cations present in the water of solution become concentrated in the body of maleic anhydride and rapidly effect decomposition of the maleic anhydride at temperatures above 190° C.

In applying the subject invention to the dehydration and recovery of maleic anhydride, boric acid or boron oxide is incorporated into the aqueous maleic acid feed prior to introduction into the dehydration and distillation column. The amounts of boric acid employed are variable and are preferably incorporated in such proportions as would be theoretically equivalent to or in excess of that required to combine with the alkali metal cations of the feed stream.

In the preferred recovery process, boric acid or boron oxide is incorporated into a crude maleic acid feed which is then introduced into the vapor phase zone of a distillation column in contact with a water-immiscible, inert, organic liquid, at least a portion of which possesses a boiling point in the range of 110° to 185° C. The distilland or still bottom of the column is comprised of a body of maleic anhydride which is maintained at reflux temperatures. The vapor phase portion of the column, or that portion of the distillation or dehydration column above the still bottoms, will contain varying concentrations of the distilland in combination with the water-entraining agent, which is preferably a water-immiscible, inert, aromatic solvent. During the course of the dehydration process, the maleic acid is dehydrated to maleic anhydride which is collected in the distilland or still bottoms along with the associated solids from the maleic acid feed.

For optimum efficiency in the extraction of the gross and hydrate water while minimizing isomerization to fumaric acid, the compounded maleic acid feed is introduced into the vapor phase zone of the column at a point which is substantially the equilibrium concentration position of the column. This position of the feed point is dependent upon the concentration of the crude maleic acid solution and will vary with changes in maleic acid concentration of the feed.

As previously indicated, the water-entraining agent is preferably an aromatic solvent, at least a portion of which possesses a boiling point in the range of 110° to 185° C. This may be a narrow-boiling, aromatic solvent, such as xylene, toluene and the like, or the entraining agent may be a mixture of solvents containing at least one component boiling in the range of 110° to 185° C. as, for example, a mixture of benzene and orthodichlorobenzene. The exact composition at any point in the column corresponds to the proportions dictated by the principles of distillation equilibrium.

The dehydrated solids or crude maleic anhydride settling in the still bottoms and reboiler section of the column may be withdrawn continuously or intermittently, and the maleic anhydride may be separated and recovered through conventional vacuum distillation as an overhead fraction while retaining associated oxidation products in the residue.

The unique inhibiting action of boric acid on the catalytic decomposition of maleic anhydride has been illustrated in laboratory experiments. In these experiments, 100 grams of maleic anhydride were refluxed in a vessel attached to a condenser, and temperatures and times were recorded beginning with the time of reflux. Whereas uncontaminated maleic anhydride was refluxed for many hours without appreciable decomposition (some darkening would result, but on cooling the product retained its crystalline character), the presence of 1 gram of sodium chloride resulted in the folowing data:

| Time (Minutes) | Temperature (Uncorrected), °C. | Observations |
|---|---|---|
| 0 | 200 | Start reflux. |
| 70 | 201.5 | Contents black. |
| 105 | 204 | |
| 120 | 208 | |
| 130 | 219 | Visible gas evolution. |
| 133 | 254 | Heating mantle removed—rapid evolution of gas—temperature continued to rise, resulting in black, tarry mass which on cooling acquired a charcoal-like consistency. |

Other experimental results employing variations in concentration and other alkali metal compounds resulted in varying times required for gross decomposition. Merely by employing alkali metal compounds possessing a greater solubility in maleic anhydride reduced the time for gross decomposition to periods well below 1 hour of refluxing.

In contrast, a further experiment was conducted in which 1 gram of boron oxide was added to a vessel containing 100 grams of maleic anhydride and 1 gram of sodium chloride. The maleic anhydride was then brought to reflux and refluxing was continued for 136 hours over a period of 17 days. Although the contents of the vessel were black, the boiling point of the refluxing maleic anhydride never exceeded 200° C. At the conclusion of the experiment, the maleic anhydride on cooling regained its crystalline character, indicating a negligible decomposition of the maleic anhydride.

Obviously, many modifications and variations of the invention as hereinbefore set forth may be made without departing from the spirit and scope thereof, and therefore only such limitations should be imposed as are indicated in the appended claims.

I claim:

1. A process for dehydrating maleic acids associated with alkali metal cations to their corresponding anhydride without appreciable decomposition of the resulting anhydride which comprises incorporating with said maleic acids a minor proportion of boric acid, in amounts of at least those theoretically required to combine with said alkali metal cations, and subjecting the compounded maleic acid to dehydrating conditions and recovering the resultant maleic anhydride.

2. The process for converting an aqueous solution of maleic acid containing alkali metal cations to maleic anhydride without appreciable decomposition of maleic anhydride which comprises incorporating into an aqueous solution of maleic acid containing alkali metal cations a minor proportion of boric acid, in amounts of at least those theoretically required to combine with said alkali metal cations, introducing said compounded maleic acid solution into contact with a body of water-immiscible, inert, organic liquid, at least a portion of which possesses a boiling point in the range of 110° to 185° C., maintaining said inert, organic liquid at a temperature above the codistillation temperature of said liquid with water, distilling from said maleic acid solution the gross and combined water of hydration as a codistillation mixture with said inert, organic liquid, and recovering the resultant maleic anhydride as a distillation residue.

3. A process according to claim 2 wherein said inert organic liquid is xylene.

References Cited in the file of this patent

UNITED STATES PATENTS

| 2,308,588 | Crowell | Jan. 19, 1943 |
| 2,509,873 | McAteer | May 30, 1950 |
| 2,683,110 | Rousseau | July 6, 1954 |
| 2,688,622 | Jaquay | Sept. 7, 1954 |